United States Patent
Burren

(10) Patent No.: US 7,969,818 B2
(45) Date of Patent: Jun. 28, 2011

(54) METHOD FOR REGULARIZING OFFSET DISTRIBUTION IN TOWED SEISMIC STREAMER DATA

(75) Inventor: Jonathan Mark Burren, Surbiton (GB)

(73) Assignee: PGS Geophysical AS, Lysaker (NO)

( * ) Notice: Subject to any disclaimer, the term of this patent is extended or adjusted under 35 U.S.C. 154(b) by 831 days.

(21) Appl. No.: 12/002,911

(22) Filed: Dec. 19, 2007

(65) Prior Publication Data

US 2009/0161486 A1    Jun. 25, 2009

(51) Int. Cl.
*G01V 1/38* (2006.01)
(52) U.S. Cl. ......................................................... 367/21
(58) Field of Classification Search .................... 367/21, 367/37, 38, 50–52
See application file for complete search history.

(56) References Cited

U.S. PATENT DOCUMENTS

| | | | | |
|---|---|---|---|---|
| 4,751,655 A | * | 6/1988 | Peacock .......................... 702/189 |
| 4,969,130 A | * | 11/1990 | Wason et al. ................... 367/73 |
| 4,974,212 A | * | 11/1990 | Sheiman .......................... 367/21 |
| 5,319,554 A | * | 6/1994 | Padhi .............................. 702/14 |
| 5,537,367 A | * | 7/1996 | Lockwood et al. ............. 367/87 |
| 5,598,378 A | | 1/1997 | Flentge |
| 5,648,938 A | | 7/1997 | Jakubowicz |
| 5,924,049 A | * | 7/1999 | Beasley et al. ................. 702/17 |
| 6,049,509 A | * | 4/2000 | Sonneland et al. ............. 367/49 |
| 6,094,620 A | * | 7/2000 | Gasparotto et al. ............ 702/14 |
| 6,889,142 B2 | | 5/2005 | Schonewille |
| 2006/0098529 A1 | * | 5/2006 | Anderson et al. ............... 367/38 |

FOREIGN PATENT DOCUMENTS

| GB | 2 402 217 | 5/2004 |
|---|---|---|
| GB | 2 445 864 | 1/2008 |

OTHER PUBLICATIONS

United Kingdom Search Report, Apr. 14, 2009.

* cited by examiner

*Primary Examiner* — Jack Keith
*Assistant Examiner* — Krystine Breier

(57) ABSTRACT

Seismic data from towed marine streamers are sorted into two-dimensional common midpoint gathers of traces. The gathered traces are ordered by offset. The offset distribution of the ordered traces is regularized. The source and receiver coordinates of the regularized traces are adjusted to reflect the regularizing.

15 Claims, 9 Drawing Sheets

FIG. 2A

| CMP | | | | |
|---|---|---|---|---|
| 31 | OFFSET | SHOT | CHAN | |
| | 150 | 1001 | 284 | |
| | 200 | 1002 | 280 | |
| | 250 | 1003 | 276 | |
| | 300 | 1004 | 272 | |
| | 350 | 1005 | 268 | |
| | 400 | 1006 | 264 | |
| | 450 | 1007 | 260 | |
| | 500 | 1008 | 256 | |
| | 550 | 1009 | 252 | |
| | 600 | 1010 | 248 | |
| | 650 | 1011 | 244 | |
| | 700 | 1012 | 240 | |
| | 750 | 1013 | 236 | |
| | 800 | 1014 | 232 | |
| | 850 | 1015 | 228 | |
| | 900 | 1016 | 224 | |
| | 950 | 1017 | 220 | |
| | 1000 | 1018 | 216 | |
| | ... | ... | ... | |
| | 3650 | 1071 | 4 | |
| Fold = 70 | | | | |

| CMP | | | | |
|---|---|---|---|---|
| 32 | OFFSET | SHOT | CHAN | |
| | 137.5 | 1001 | 285 | |
| | 187.5 | 1002 | 281 | |
| | 237.5 | 1003 | 277 | |
| | 287.5 | 1004 | 273 | |
| | 337.5 | 1005 | 269 | |
| | 387.5 | 1006 | 265 | |
| | 437.5 | 1007 | 261 | |
| | 487.5 | 1008 | 257 | |
| | 537.5 | 1009 | 253 | |
| | 587.5 | 1010 | 249 | |
| | 637.5 | 1011 | 245 | |
| | 687.5 | 1012 | 241 | |
| | 737.5 | 1013 | 237 | |
| | 787.5 | 1014 | 233 | |
| | 837.5 | 1015 | 229 | |
| | 887.5 | 1016 | 225 | |
| | 937.5 | 1017 | 221 | |
| | 987.5 | 1018 | 217 | |
| | ... | ... | ... | |
| | 3637.5 | 1071 | 5 | |
| Fold = 70 | | | | |

| CMP | | | | |
|---|---|---|---|---|
| 33 | OFFSET | SHOT | CHAN | |
| | 125 | 1001 | 286 | |
| | 175 | 1002 | 282 | |
| | 225 | 1003 | 278 | |
| | 275 | 1004 | 274 | |
| | 325 | 1005 | 270 | |
| | 375 | 1006 | 266 | |
| | 425 | 1007 | 262 | |
| | 475 | 1008 | 258 | |
| | 525 | 1009 | 254 | |
| | 575 | 1010 | 250 | |
| | 625 | 1011 | 246 | |
| | 675 | 1012 | 242 | |
| | 725 | 1013 | 238 | |
| | 775 | 1014 | 234 | |
| | 825 | 1015 | 230 | |
| | 875 | 1016 | 226 | |
| | 925 | 1017 | 222 | |
| | 975 | 1018 | 218 | |
| | ... | ... | ... | |
| | 3625 | 1071 | 6 | |
| Fold = 70 | | | | |

| CMP | | | | |
|---|---|---|---|---|
| 34 | OFFSET | SHOT | CHAN | |
| | 112.5 | 1001 | 287 | |
| | 162.5 | 1002 | 283 | |
| | 212.5 | 1003 | 279 | |
| | 262.5 | 1004 | 275 | |
| | 312.5 | 1005 | 271 | |
| | 362.5 | 1006 | 267 | |
| | 412.5 | 1007 | 263 | |
| | 462.5 | 1008 | 259 | |
| | 512.5 | 1009 | 255 | |
| | 562.5 | 1010 | 251 | |
| | 612.5 | 1011 | 247 | |
| | 662.5 | 1012 | 243 | |
| | 712.5 | 1013 | 239 | |
| | 762.5 | 1014 | 235 | |
| | 812.5 | 1015 | 231 | |
| | 862.5 | 1016 | 227 | |
| | 912.5 | 1017 | 223 | |
| | 962.5 | 1018 | 219 | |
| | ... | ... | ... | |
| | 3612.5 | 1071 | 7 | |
| Fold = 70 | | | | |

| CMP | OFFSET | SHOT | CHAN | CMP | OFFSET | SHOT | CHAN |
|---|---|---|---|---|---|---|---|
| | 150 | 1001 | 284 | | 137.5 | 1001 | 285 |
| | 175 | 1001.5 | 282 | | 162.5 | 1001.5 | 283 |
| | 200 | 1002 | 280 | | 187.5 | 1002 | 281 |
| | 225 | 1002.5 | 278 | | 212.5 | 1002.5 | 279 |
| | 250 | 1003 | 276 | | 237.5 | 1003 | 277 |
| | 275 | 1003.5 | 274 | | 262.5 | 1003.5 | 275 |
| | 300 | 1004 | 272 | | 287.5 | 1004 | 273 |
| | 325 | 1004.5 | 270 | | 312.5 | 1004.5 | 271 |
| | 350 | 1005 | 268 | | 337.5 | 1005 | 269 |
| | 375 | 1005.5 | 266 | | 362.5 | 1005.5 | 267 |
| | 400 | 1006 | 264 | | 387.5 | 1006 | 265 |
| | 425 | 1006.5 | 262 | | 412.5 | 1006.5 | 263 |
| | 450 | 1007 | 260 | | 437.5 | 1007 | 261 |
| | 475 | 1007.5 | 258 | | 462.5 | 1007.5 | 259 |
| | 500 | 1008 | 256 | | 487.5 | 1008 | 257 |
| | 525 | 1008.5 | 254 | | 512.5 | 1008.5 | 255 |
| | 550 | 1009 | 252 | | 537.5 | 1009 | 253 |
| | 575 | 1009.5 | 250 | | 562.5 | 1009.5 | 251 |
| 31 | 600 | 1010 | 248 | 32 | 587.5 | 1010 | 249 |
| | 625 | 1010.5 | 246 | | 612.5 | 1010.5 | 247 |
| | 650 | 1011 | 244 | | 637.5 | 1011 | 245 |
| | 675 | 1011.5 | 242 | | 662.5 | 1011.5 | 243 |
| | 700 | 1012 | 240 | | 687.5 | 1012 | 241 |
| | 725 | 1012.5 | 238 | | 712.5 | 1012.5 | 239 |
| | 750 | 1013 | 236 | | 737.5 | 1013 | 237 |
| | 775 | 1013.5 | 234 | | 762.5 | 1013.5 | 235 |
| | 800 | 1014 | 232 | | 787.5 | 1014 | 233 |
| | 825 | 1014.5 | 230 | | 812.5 | 1014.5 | 231 |
| | 850 | 1015 | 228 | | 837.5 | 1015 | 229 |
| | 875 | 1015.5 | 226 | | 862.5 | 1015.5 | 227 |
| | 900 | 1016 | 224 | | 887.5 | 1016 | 225 |
| | 925 | 1016.5 | 222 | | 912.5 | 1016.5 | 223 |
| | 950 | 1017 | 220 | | 937.5 | 1017 | 221 |
| | 975 | 1017.5 | 218 | | 962.5 | 1017.5 | 219 |
| | 1000 | 1018 | 216 | | 987.5 | 1018 | 217 |
| | ... | ... | ... | | ... | ... | ... |
| | 3625 | 1070.5 | 6 | | 3612.5 | 1070.5 | 7 |
| | 3650 | 1071 | 4 | | 3637.5 | 1071 | 5 |
| | *Fold = 140* | | | | *Fold = 140* | | |

| CMP | OFFSET | SHOT | CHAN |
|---|---|---|---|
| | 125 | 1001 | 286 |
| | 150 | 1001.5 | 284 |
| | 175 | 1002 | 282 |
| | 200 | 1002.5 | 280 |
| | 225 | 1003 | 278 |
| | 250 | 1003.5 | 276 |
| | 275 | 1004 | 274 |
| | 300 | 1004.5 | 272 |
| | 325 | 1005 | 270 |
| | 350 | 1005.5 | 268 |
| | 375 | 1006 | 266 |
| | 400 | 1006.5 | 264 |
| | 425 | 1007 | 262 |
| | 450 | 1007.5 | 260 |
| | 475 | 1008 | 258 |
| | 500 | 1008.5 | 256 |
| | 525 | 1009 | 254 |
| | 550 | 1009.5 | 252 |
| 33 | 575 | 1010 | 250 |
| | 600 | 1010.5 | 248 |
| | 625 | 1011 | 246 |
| | 650 | 1011.5 | 244 |
| | 675 | 1012 | 242 |
| | 700 | 1012.5 | 240 |
| | 725 | 1013 | 238 |
| | 750 | 1013.5 | 236 |
| | 775 | 1014 | 234 |
| | 800 | 1014.5 | 232 |
| | 825 | 1015 | 230 |
| | 850 | 1015.5 | 228 |
| | 875 | 1016 | 226 |
| | 900 | 1016.5 | 224 |
| | 925 | 1017 | 222 |
| | 950 | 1017.5 | 220 |
| | 975 | 1018 | 218 |
| | ... | ... | ... |
| | 3600 | 1070.5 | 8 |
| | 3625 | 1071 | 6 |
| | Fold = 140 | | |

23

| CMP | OFFSET | SHOT | CHAN |
|---|---|---|---|
| | 112.5 | 1001 | 287 |
| | 137.5 | 1001.5 | 285 |
| | 162.5 | 1002 | 283 |
| | 187.5 | 1002.5 | 281 |
| | 212.5 | 1003 | 279 |
| | 237.5 | 1003.5 | 277 |
| | 262.5 | 1004 | 275 |
| | 287.5 | 1004.5 | 273 |
| | 312.5 | 1005 | 271 |
| | 337.5 | 1005.5 | 269 |
| | 362.5 | 1006 | 267 |
| | 387.5 | 1006.5 | 265 |
| | 412.5 | 1007 | 263 |
| | 437.5 | 1007.5 | 261 |
| | 462.5 | 1008 | 259 |
| | 487.5 | 1008.5 | 257 |
| | 512.5 | 1009 | 255 |
| | 537.5 | 1009.5 | 253 |
| 34 | 562.5 | 1010 | 251 |
| | 587.5 | 1010.5 | 249 |
| | 612.5 | 1011 | 247 |
| | 637.5 | 1011.5 | 245 |
| | 662.5 | 1012 | 243 |
| | 687.5 | 1012.5 | 241 |
| | 712.5 | 1013 | 239 |
| | 737.5 | 1013.5 | 237 |
| | 762.5 | 1014 | 235 |
| | 787.5 | 1014.5 | 233 |
| | 812.5 | 1015 | 231 |
| | 837.5 | 1015.5 | 229 |
| | 862.5 | 1016 | 227 |
| | 887.5 | 1016.5 | 225 |
| | 912.5 | 1017 | 223 |
| | 937.5 | 1017.5 | 221 |
| | 962.5 | 1018 | 219 |
| | ... | ... | ... |
| | 3587.5 | 1070.5 | 9 |
| | 3612.5 | 1071 | 7 |
| | Fold = 140 | | |

| CMP | OFFSET | SHOT | CHAN |
|---|---|---|---|
| | 150 | 1001 | 284 |
| | 200 | 1002 | 280 |
| | 250 | 1003 | 276 |
| | 300 | 1004 | 272 |
| | 350 | 1005 | 268 |
| | 400 | 1006 | 264 |
| | 450 | 1007 | 260 |
| | 500 | 1008 | 256 |
| | 550 | 1009 | 252 |
| | 600 | 1010 | 248 |
| | 650 | 1011 | 244 |
| | 700 | 1012 | 240 |
| | 750 | 1013 | 236 |
| | 800 | 1014 | 232 |
| | 850 | 1015 | 228 |
| | 900 | 1016 | 224 |
| | 950 | 1017 | 220 |
| | 1000 | 1018 | 216 |
| | ... | ... | ... |
| | 3650 | 1071 | 4 |

Fold = 70 — 21

32

| CMP | OFFSET | SHOT | CHAN |
|---|---|---|---|
| | 100 | 1001 | 285 |
| | 150 | 1002 | 281 |
| | 200 | 1003 | 277 |
| | 250 | 1004 | 273 |
| | 300 | 1005 | 269 |
| | 350 | 1006 | 265 |
| | 400 | 1007 | 261 |
| | 450 | 1008 | 257 |
| | 500 | 1009 | 253 |
| | 550 | 1010 | 249 |
| | 600 | 1011 | 245 |
| | 650 | 1012 | 241 |
| | 700 | 1013 | 237 |
| | 750 | 1014 | 233 |
| | 800 | 1015 | 229 |
| | 850 | 1016 | 225 |
| | 900 | 1017 | 221 |
| | 950 | 1018 | 217 |
| | ... | ... | ... |
| | 3600 | 1071 | 5 |

Fold = 70 — 22

33

| CMP | OFFSET | SHOT | CHAN |
|---|---|---|---|
| | 100 | 1001 | 286 |
| | 150 | 1002 | 282 |
| | 200 | 1003 | 278 |
| | 250 | 1004 | 274 |
| | 300 | 1005 | 270 |
| | 350 | 1006 | 266 |
| | 400 | 1007 | 262 |
| | 450 | 1008 | 258 |
| | 500 | 1009 | 254 |
| | 550 | 1010 | 250 |
| | 600 | 1011 | 246 |
| | 650 | 1012 | 242 |
| | 700 | 1013 | 238 |
| | 750 | 1014 | 234 |
| | 800 | 1015 | 230 |
| | 850 | 1016 | 226 |
| | 900 | 1017 | 222 |
| | 950 | 1018 | 218 |
| | ... | ... | ... |
| | 3600 | 1071 | 6 |

Fold = 70 — 23

34

| CMP | OFFSET | SHOT | CHAN |
|---|---|---|---|
| | 100 | 1001 | 287 |
| | 150 | 1002 | 283 |
| | 200 | 1003 | 279 |
| | 250 | 1004 | 275 |
| | 300 | 1005 | 271 |
| | 350 | 1006 | 267 |
| | 400 | 1007 | 263 |
| | 450 | 1008 | 259 |
| | 500 | 1009 | 255 |
| | 550 | 1010 | 251 |
| | 600 | 1011 | 247 |
| | 650 | 1012 | 243 |
| | 700 | 1013 | 239 |
| | 750 | 1014 | 235 |
| | 800 | 1015 | 231 |
| | 850 | 1016 | 227 |
| | 900 | 1017 | 223 |
| | 950 | 1018 | 219 |
| | ... | ... | ... |
| | 3600 | 1071 | 7 |

Fold = 70 — 24

*FIG. 4A*

METHOD FOR REGULARIZING OFFSET DISTRIBUTION IN TOWED SEISMIC STREAMER DATA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of processing towed seismic streamer data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically, sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes, and recorded.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

The resulting seismic data obtained from the survey is processed to yield information relating to the geologic structure and properties of the subterranean formations in the area being surveyed. The processed seismic data is displayed and analyzed to reveal potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. Constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

Seismic acquisition procedures, including marine surveys, typically provide spatial coverage based on discrete "bins", also known as "classes", into which the acquired seismic data are assigned. Classifying seismic data in bins provides a convenient way of organizing and preparing the data for key processing stages such as three-dimensional (3D) Fourier midpoint and azimuth regularization, 3D Surface Related Multiple Elimination (SRME) and imaging using pre-stack migration.

Variations of these properties within the bins can create artifacts for some processing stages—sometimes known as an acquisition footprint—so it can be desirable to regularize the data, i.e. interpolate the data to the center of the bins. In particular, it has been found useful to regularize the seismic data with regard to offset, spatial distances between source and receiver. Thus, a need exists for a method for regularizing offset distribution in towed seismic streamer data.

BRIEF SUMMARY OF THE INVENTION

The invention is a method for regularizing offset distribution in seismic data from towed marine streamers. The seismic data are sorted into two-dimensional common midpoint gathers of traces. The gathered traces are ordered by offset. The offset distribution of the ordered traces is regularized. The source and receiver coordinates of the regularized traces are adjusted to reflect the regularizing.

BRIEF DESCRIPTION OF THE DRAWINGS

The invention and its advantages may be more easily understood by reference to the following detailed description and the attached drawings, in which:

FIG. 2A is a tabulation of the CMP, offset, shot, and channel values corresponding to the example introduced in FIG. 1;

FIG. 3A is a tabulation of the CMP, offset, shot, and channel values resulting from trace interpolation;

FIG. 4A is a tabulation of the CMP, offset, shot, and channel values resulting from offset regularization;

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Seismic signals, also called "traces", indicate some measure of seismic wave energy, such as displacement, velocity, acceleration, or pressure, can be grouped or sorted into "gathers". For example, a shot gather is the group of signals recorded for a single firing of a particular seismic source.

For quality control purposes, the averaging, or "stacking", of traces that share a common midpoint is normally carried out to improve the signal-to-noise ratio. Such traces may have different offsets between source and receiver, which implies that the seismic waves have propagated at different angles to and from the formations of interest. To compensate for the resulting differences in traveltime, traces are commonly subjected to a normal move-out (NMO) correction that applies a changing time shift to each trace based on the offset distance. Stacking may then be performed with the NMO-corrected traces. Whether or not common midpoint stacking is employed, seismic surveys are often analyzed in terms of the resulting midpoint pattern to ensure that adequate coverage is being obtained.

Offset is typically given as a nominal offset class or bin, that is, a desired or ideal offset for a proposed survey, rather than the actual offset of the trace. The classes or bins are typically given as tolerances on a regularly spaced grid. For example, 100 m offset spacing yields offset class 1 covering offsets from 151 m to 250 m (200 m±50 m), offset class 2 covering offsets from 251 m to 350 m (300 m±50 m), and so on.

The invention is a method for regularizing offset distribution in seismic data from towed marine seismic streamers. The seismic data is first sorted into two-dimensional common midpoint (2D-CMP) gathers (pairing of a single source line and single cable). This sorting can be thought of as transforming the seismic data into the 2D-CMP domain. Within each 2D-CMP gather, the seismic data is further ordered by offset. Preferably, the true 3D offset is used for this secondary sort key.

Figure 1:
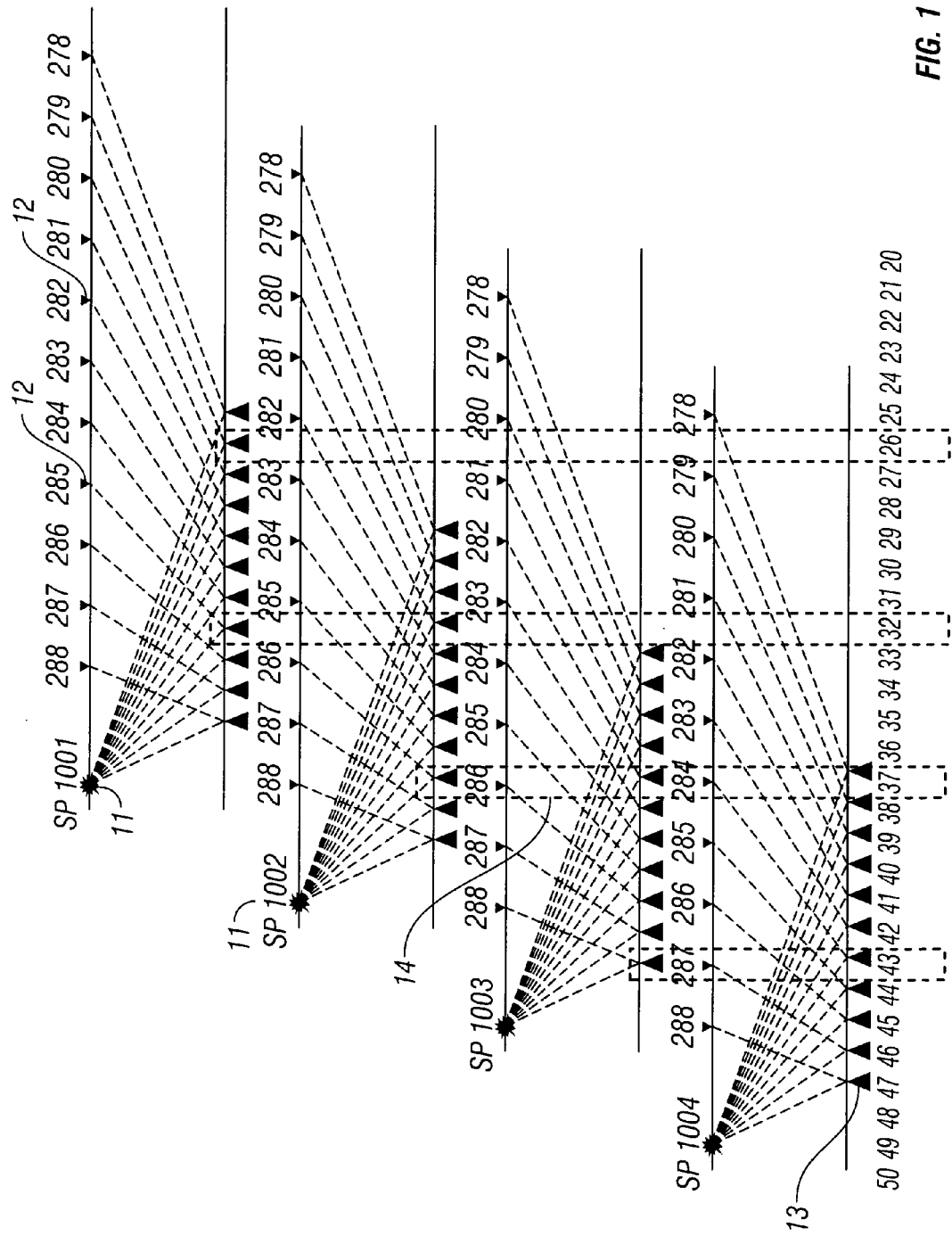
FIG. 1 is a schematic diagram of an example marine acquisition system suitable for use with the invention.

FIG. 1 is a schematic diagram of an example marine acquisition system suitable for use with the invention. Illustrated in the 2D-CMP domain are four successive shot points 11, numbered 1001 to 1004, eleven relative channel or receiver positions 12, numbered 278 to 288, and resulting eleven common midpoints 13, out of 20 to 50. The common midpoints 13 for different pairs of shot points 11 and receiver positions 12 are illustrated by dotted rectangles 14. The shot spacing is 25 m shot and the receiver spacing is 12.5 m, assuming perfect acquisition. This results in a CMP spacing of 6.25 m, for a shot-to-CMP ratio of 4:1.

The offset distribution within a seismic dataset is inherently linked to the spacing between shot points and the spacing between common midpoints, often referred to as the shot-to-CMP ratio or cycle. Environmental factors during the acquisition will alter the predicted distribution, but for practical purposes this ratio is valid. Once sorted to the 2D-CMP domain the nominal offset spacing is consistent between different 2D-CMPs, though the actual offsets may vary between 2D-CMPs.

Figure 2B:
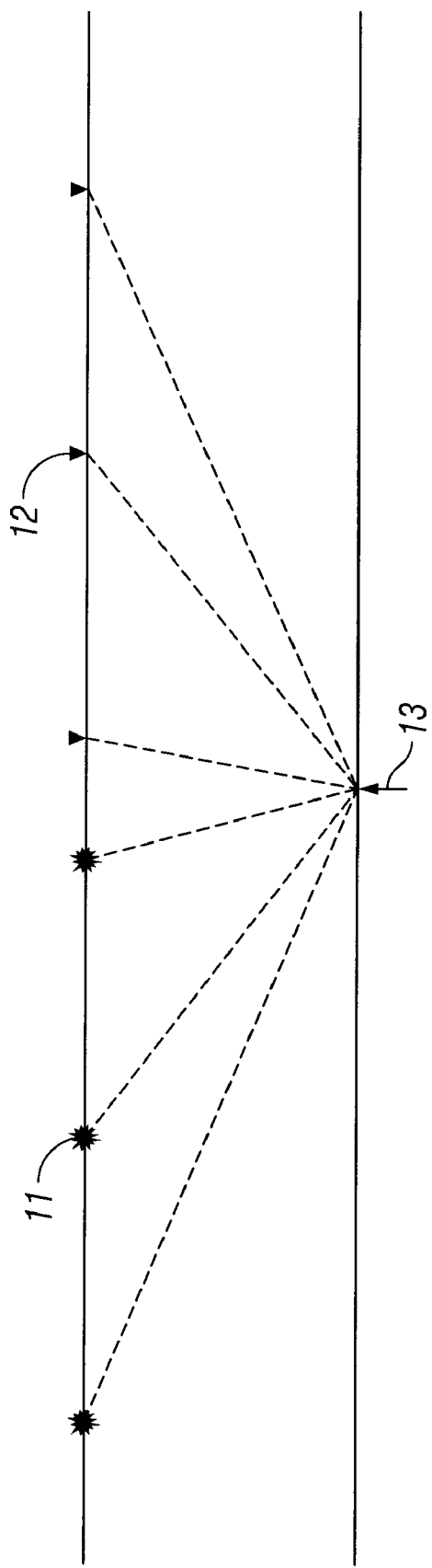
FIG. 2B is a schematic diagram of the traces corresponding to the example in FIG. 2A.

FIG. 2A shows a tabulation of the values for CMP 21, offset 22, shot 23, and channel 24 resulting from extending the example introduced in FIG. 1. FIG. 2B is a schematic diagram of the traces corresponding to the example in FIG. 2A. Representative shot points 11, receiver positions 12, and the corresponding midpoint 13 are illustrated.

If spatial aliasing protection is desired, then a travel time correction can be applied first. Several traveltime corrections may be used, one of which, currently widely used in this industry, is normal move-out correction. NMO is a standard processing technique within the seismic data acquisition industry which attempts to remove timing discrepancies arising from the variations in travel times caused by different source-receiver separations (offset). The correction makes use of the known source-receiver separation together with a user-specified (generally time-variable) velocity factor together with a hyperbolic assumption for the traveltime behavior. The traveltime correction minimizes the change in traveltime differences between traces, which, in turn, minimizes under-sampling, i.e., aliasing, in an interpolation step.

Figure 3B:
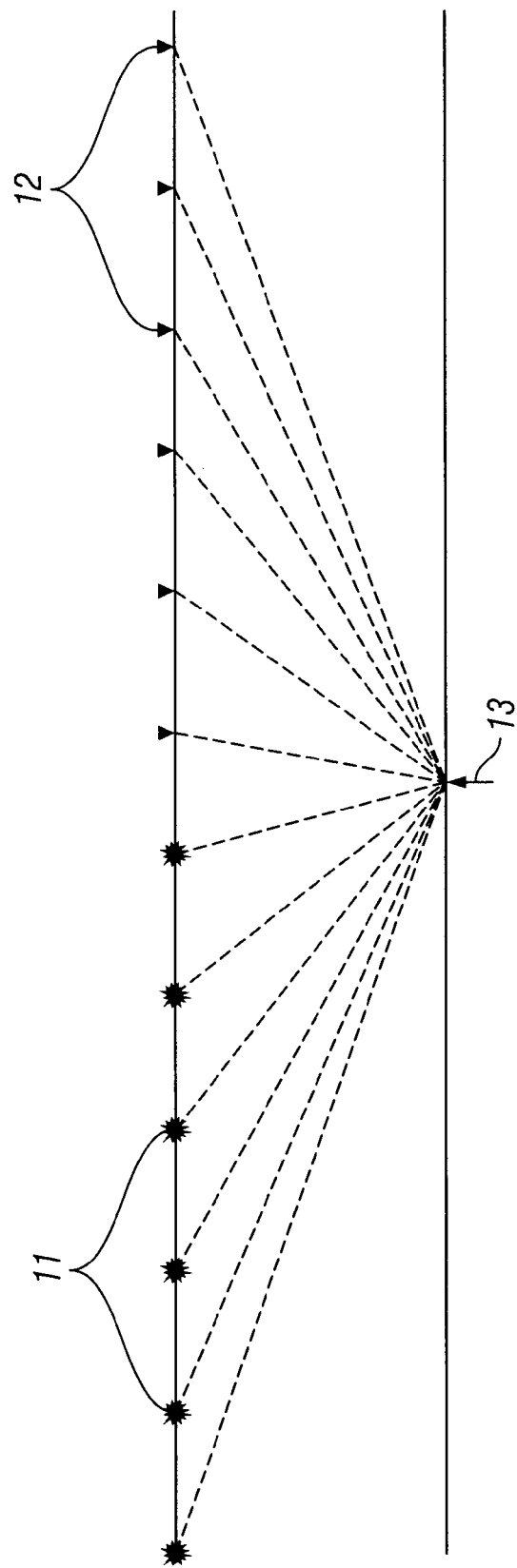
FIG. 3B is a schematic diagram of the traces corresponding to the interpolated traces in FIG. 3A.

In one embodiment, trace interpolation is performed to replace any traces that are missing or corrupted in the seismic survey data. In another embodiment, if the seismic data appears to show spatial aliasing, then the seismic data may be interpolated to yield additional seismic traces so that the combined seismic data has half the nominal offset spacing. This interpolation can be done using a FK (frequency-wave-number domain) unwrapping technique or a similar technique. The result of this interpolation is shown in FIGS. 3A and 3B. FIG. 3A shows the tabulation of the values for CMP 21, offset 22, shot 23, and channel 24 resulting from the trace interpolation. FIG. 3B is a schematic diagram of the traces corresponding to the interpolated traces in FIG. 3A. The difference in the distribution of the representative shot points 11, receiver positions 12, and the corresponding midpoint 13 in comparison with FIG. 2B is illustrated.

Figure 4B:
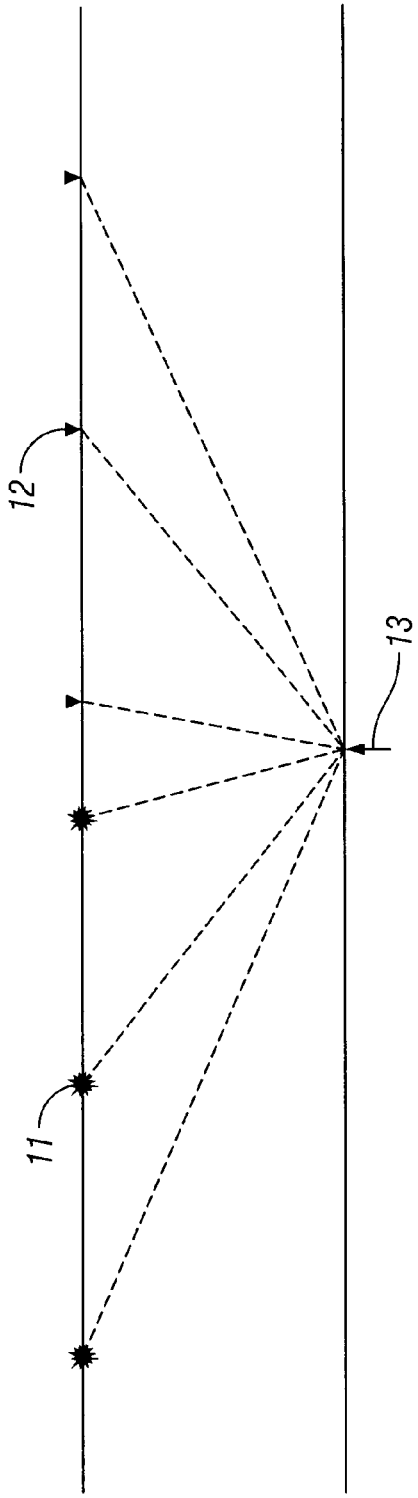
FIG. 4B is a schematic diagram of the traces corresponding to the regularized traces in FIG. 4A.

The offset distribution is regularized within the 2D-CMP domain by interpolating the seismic data from the actual acquired offset distribution to the regular (nominal) offset distribution. The interpolation can be accomplished using a Fourier transform, a spline technique, or any similar technique. Any interpolation method that acts on the acquired source and receiver coordinates, and thus the true offset, can be employed. The result of this offset regularization is shown in FIGS. 4A and 4B. FIG. 4A shows the tabulation of the values for CMP 21, offset 22, shot 23, and channel 24 resulting from the offset regularization. FIG. 4B is a schematic diagram of the traces corresponding to the regularized traces in FIG. 4A, showing a similar distribution of the representative shot points 11, receiver positions 12, and the corresponding midpoint 13 as in FIG. 2B.

After the offset distribution is regularized, the source and receiver coordinates are adjusted to take into account the changes to the offset values. Preferably, the locations of the sources and receivers are only moved in the sail line (in-line) direction, which can be easily and efficiently done in the 2D-CMP domain.

If an NMO or other travel time correction was introduced earlier, then this correction is removed. This reversal of the travel time correction is done using the new source and receiver coordinates. If interpolated traces were introduced earlier, then these traces are removed.

Finally, the original shot, FFID, and channel number headers of the input data are maintained. Maintaining this information allows the original gathers to be reconstructed, if necessary, for further processing. For example, after the offsets have been regularized by the method of this invention, azimuthal regularization may also be applied, as described in Michael Schonewille, U.S. Pat. No. 6,889,142 B2, "Method of Correcting for Time Shifts in Seismic Data Resulting from Azimuthal Variation".

The regularized seismic traces can be used to great benefit for subsequent processing, as the acquisition footprint has been removed. It is much easier now for the final images to be examined by a user or a computer to locate hydrocarbon reservoirs or mineral deposits within the mapped region of interest.

Figure 5:
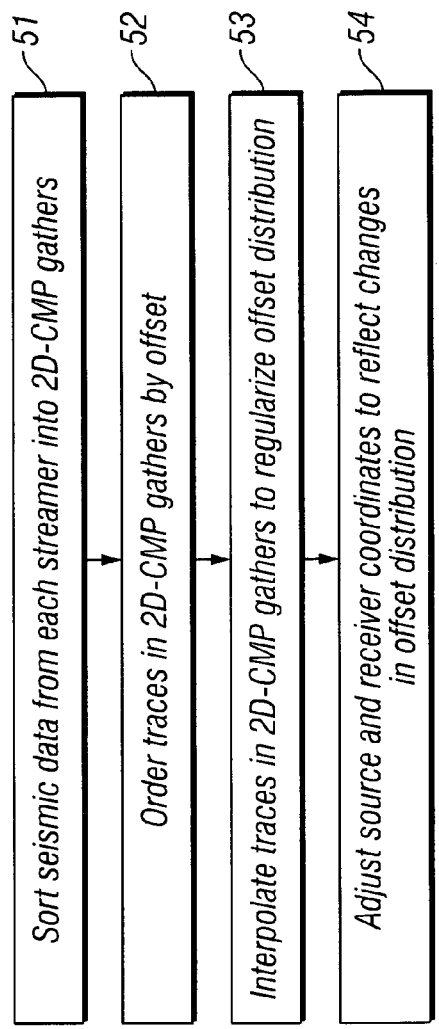
FIG. 5 is a flowchart illustrating the processing steps of a first embodiment of the method of the invention for regularizing offset distribution in seismic data from towed marine seismic streamers.

FIG. 5 shows a flowchart illustrating the processing steps of a first embodiment of the method of the invention for regularizing offset distribution in seismic data from towed marine seismic streamers.

At step 51, the seismic data from each streamer is sorted into two-dimensional (2D) Common Mid Point (CMP) gathers.

At step 52, traces in the 2D-CMP gathers from step 51 are ordered by offset. The ordering can be either from lowest to highest in sequence or from highest to lowest in sequence. The offset used in this step is the true three-dimensional offset.

At step 53, the traces in the 2D-CMP gather from step 52 are interpolated to regularize the offset distribution. In particular, the interpolation is applied to yield traces with a regular offset distribution from the acquired offset distribution, which need not be as regular as desired. The interpolation may be accomplished, for example, by a Fourier transform technique, a spline technique, or any similar technique.

At step 54, the source and receiver coordinates of the regularized data from step 53 are adjusted to reflect the changes in the offset distribution. In a preferred embodiment, the source and receiver coordinates are only moved in the sail line (inline) direction.

Figure 6:
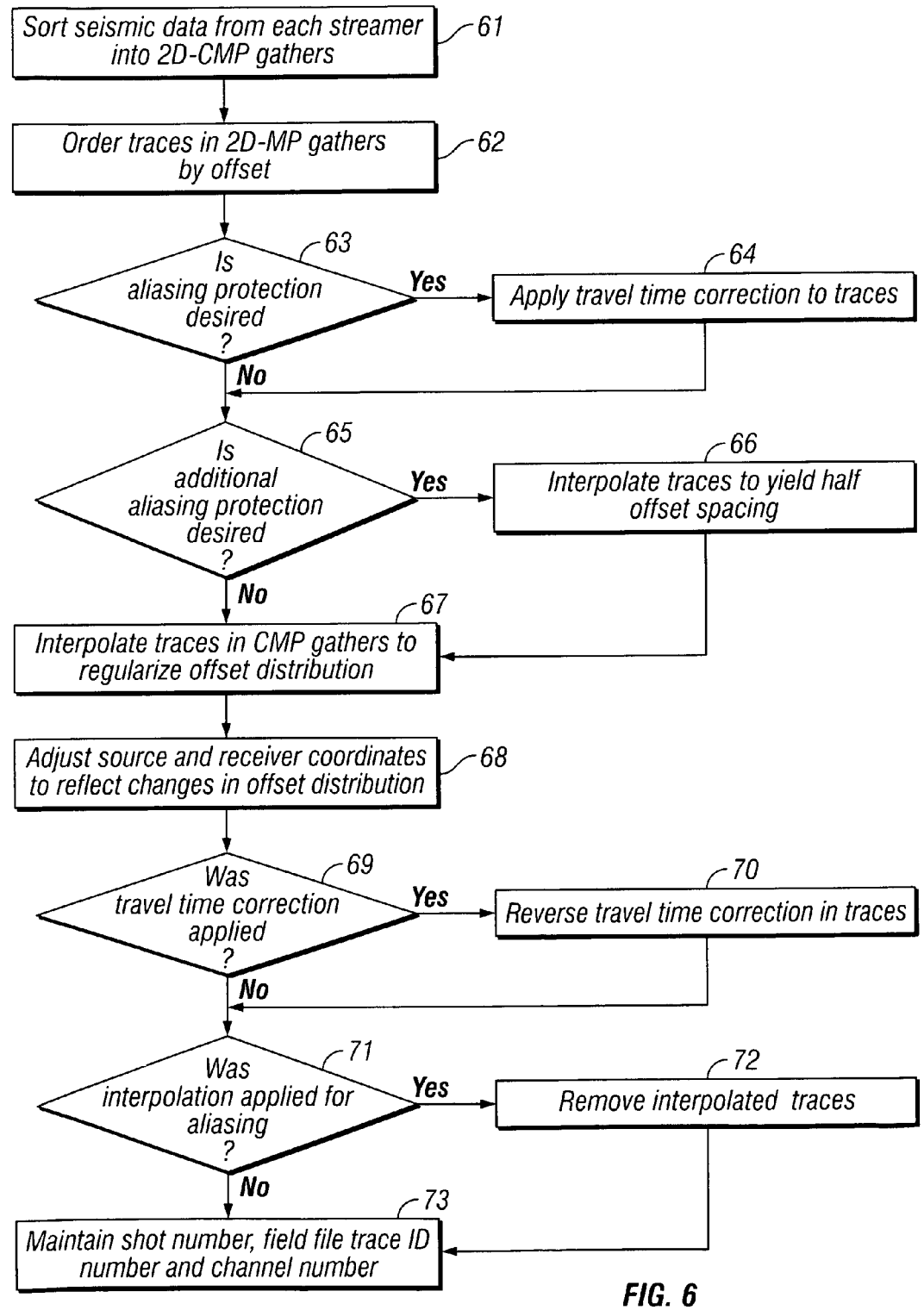
FIG. 6 is a flowchart illustrating the processing steps of a second embodiment of the method of the invention for regularizing offset distribution in seismic data from towed marine seismic streamers.

FIG. 6 shows a flowchart illustrating the processing steps of a second embodiment of the method of the invention for regularizing offset distribution in seismic data from towed marine seismic streamers.

At step 61, the seismic data from each streamer is sorted into 2D-CMP gathers.

At step 62, traces in the 2D-CMP gathers from step 61 are ordered by offset. The ordering can be either from lowest to highest in sequence or from highest to lowest in sequence. The offset used in this step is the true three-dimensional offset.

At step 63, it is determined if aliasing protection is desired for the upcoming offset distribution regularization step. If aliasing protection is desired, then proceed to step 64 to correct for it. If additional aliasing protection is not desired, then proceed to step 65 to continue the process.

At step 64, the traces in the 2D-CMP gather from step 62 are corrected for different travel times in the traces in the gather. In a preferred embodiment, the travel time correction is normal move-out correction.

At step 65, it is determined if additional aliasing protection is desired, if, for instance, aliasing is observed in the 2D-CMP gathers from steps 62 or 64. If aliasing protection is desired, then proceed to step 66 to correct for it. If aliasing protection is not desired, then proceed to step 67 to continue the process.

At step 66, the traces in the 2D-CMP gathers from step 64 are interpolated to yield traces with half the offset spacing as in the original seismic data from step 61. The interpolation may be accomplished, for example, by an FK unwrapping technique or a similar technique. This optional interpolation step improves the spatial sampling of the offsets in preparation for the offset regularization step.

At step 67, the traces in the 2D-CMP gather from step 62, the corrected traces from the 2D-CMP gather from step 64, or the interpolated traces from step 66 are interpolated to regularize the offset distribution. In particular, the interpolation is applied to yield traces with a regular offset distribution from the acquired offset distribution, which need not be as regular as desired. The interpolation may be accomplished, for example, by a Fourier transform technique, a spline technique, or a similar technique.

At step 68, the source and receiver coordinates of the regularized data from step 67 are adjusted to reflect the changes in the offset distribution. In a preferred embodiment, the source and receiver coordinates are only moved in the sail line (inline) direction.

At step 69, it is determined if it is necessary to remove the travel time correction optionally made in step 64. If necessary, then proceed to step 70 to do so. If not necessary, then proceed to step 71 to continue the process.

At step 70, the travel time correction made in step 64 for aliasing protection during the regularization step in step 67 is reversed.

At step 71, it is determined if it is necessary to remove the interpolated traces optionally added in step 66. If necessary to remove the added traces, then proceed to step 72 to remove them. If not necessary to remove the traces, then proceed to step 73 to continue the process.

At step 72, the interpolated traces added in step 66 to halve the offset spacing are removed.

At step 73, shot number, Field File trace Identification number (FFID), and channel number are all maintained as in the original input seismic data in step 61.

One of the benefits of this invention is that it allows other, more sophisticated, processing to applied more effectively. This provides an efficient method for applying a key pre-conditioning stage to seismic data prior to bin-centering and azimuth regularization and pre-stack migration. Regularization is important for 3D processing in general and in particular for cutting edge technologies such as 3D SRME and 4D (time-lapse) processing.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for regularizing offset distribution in seismic data from towed marine streamers, comprising:
    sorting the seismic data into common midpoint gathers of traces;
    ordering the gathered traces by offset;
    regularizing the offset distribution of the ordered traces; and
    adjusting the source and receiver coordinates of the regularized traces to reflect the regularizing.

2. The method of claim 1, wherein the step of ordering comprises:
    ordering the gathered traces by a true three-dimension offset.

3. The method of claim 1, wherein the step of ordering further comprises:
    applying a traveltime correction to the ordered traces.

4. The method of claim 3, wherein the traveltime correction applied is a normal moveout correction.

5. The method of claim 3, wherein the step of ordering further comprises:
    interpolating the ordered traces.

6. The method of claim 5, wherein the step of interpolating the ordered traces comprises:
    interpolating the ordered traces to replace missing traces.

7. The method of claim 5, wherein the step of interpolating the ordered traces comprises:
    interpolating the ordered traces to half the nominal offset spacing.

8. The method of claim 7, wherein the interpolating the ordered traces to half the nominal offset spacing is accomplished by a frequency-wavenumber domain unwrapping technique.

9. The method of claim 3, wherein the step of adjusting further comprises:
    reversing the traveltime correction using the adjusted source and receiver coordinates.

10. The method of claim 7, wherein the step of adjusting further comprises:
    removing the traces added in the step of interpolating the ordered traces to half the nominal offset spacing.

11. The method of claim 1, wherein the step of regularizing comprises:
    interpolating the traces to change the offset distribution acquired in the seismic data to a regular offset distribution.

12. The method of claim 11, wherein interpolating the traces to change the acquired offset distribution to the regular distribution is accomplished by a Fourier transform technique.

13. The method of claim 11, wherein interpolating the traces to change the acquired offset distribution to the regular distribution is accomplished by a spline technique.

14. The method of claim 1, wherein the step of adjusting is done in the sail line direction.

15. The method of claim 1, further comprising:
    maintaining original shot numbers, field file identification numbers, and channel numbers of input seismic data.

* * * * *